Nov. 2, 1965  R. E. OLSON  3,215,016

MARKER FOR MOUNTED PHOTOGRAPHIC TRANSPARENCIES

Filed June 12, 1963

INVENTOR.
RICHARD E. OLSON
BY
ATTORNEYS

United States Patent Office 3,215,016
Patented Nov. 2, 1965

3,215,016
MARKER FOR MOUNTED PHOTOGRAPHIC TRANSPARENCIES
Richard E. Olson, 1211 Winnetka, Minneapolis, Minn.
Filed June 12, 1963, Ser. No. 287,425
3 Claims. (Cl. 83—467)

This invention relates to a marking device for mounted photographic transparencies or slides and more particularly to a device for placing a notch in the periphery of such slides so that the slide may be properly oriented with respect to its front and back, as well as to its top and bottom.

In the handling and viewing of photographic transparencies or slides it becomes necessary to determine the proper positioning of the face of the slide and also to have the proper edge uppermost. In the case where the slide is viewed directly it is often inverted from the position in which it is fed into a projector. When the slide is interchanged between viewing devices, or even when it is merely handled, the edges may become accidentally rotated 90 degrees or 180 degrees or it may be laid away face forward one time and face rearward the next. Since the projected image of the transparent slide thus may be a mirror image (left for right) or may be horizontal or inverted instead of right side up, it becomes necessary to reorient the slide. The difficulty is compounded when there is no light in which to make the adjustment as is usually the case in a darkened room where the projector is used.

Even when slide trays or magazines are employed the slides may be occasionally reversed or inverted when they are filed or when the individual slides are accidentally or purposely removed and replaced.

It is a general object of the instant invention to provide a device for notching the edge of the outer slide frame of a photographic transparency so as to render it capable of being oriented either through observation or through the sense of touch so that it may be inserted properly into a slide carriage or magazine.

Another object is to provide a device of the class described which may be employed to cut a notch at a desired location for the purposes described irrespective of the size of the slide transparency.

A further object is to provide a device for notching slide frames which is simple and efficient in construction and operation and will provide a convenient angulation and back lighting for the initial orientation of the slide preparatory to notching.

A still further object is to provide a novel punch and die construction which is simple and effective for the purpose described.

These and other objects and advantages of this invention will more fully appear from the following description, made in connection with the accompanying drawing, wherein like reference characters refer to the same or similar parts throughout the several views and in which.

Figure 2:
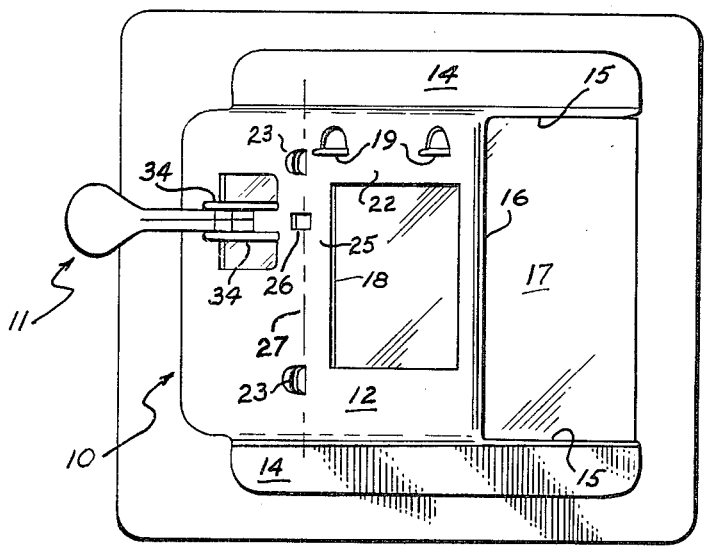
FIGURE 2 is a top plan view of FIGURE 1.

With continued reference to the drawing my device comprises generally a base 9, a support 10 and a swingable punch 11. The support 10 may be conveniently formed of sheet material presenting a slide supporting surface 12 which is angulated upwardly and rearwardly from the base 9. Side portions 13 extend downwardly from the edges of slide supporting surface 12 and terminate downwardly in a pair of base flanges 14 as shown in FIGURE 2. The rear edges 15 of the side members 13 and the rear edge 16 of the angulated slide supporting surface 12 define an opening at the rear of the device which permits light to enter beneath the slide supporting surface 12. In order to increase the intensity of the light entering the device I may employ a reflective sheet such as the white card 17 which abuts against the base member 9 and the base flanges 14 as shown in FIGURE 2.

An opening defined by the cut edge 18 is formed through the slide supporting surface 12 so as to render all or a portion of a slide transparency placed upon the supporting surface visible. A sufficient area of the slide should be viewed in order to determine the correct orientation thereof prior to the locating and notching of the slide.

Figure 3:
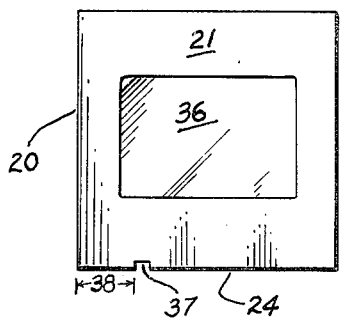
FIGURE 3 is a plan view of a photographic transparency or slide which has been notched in accordance with the device.

Stop means such as the ears 19 project upwardly from the slide supporting surface 12 and may be conveniently punched from the sheet material of which it is formed. The ears 19 are spaced in such a manner as to define a straight edge for abutment with a vertical side 20 of the transparency slide 21 as shown in FIGURE 3. It will be observed that a marginal surface 22 lies between the ears 19 and the opening 18 so as to adequately contact and support the margin of slide 21 which lies adjacent the edge 20.

In a similar manner stop means such as the ears 23 are formed from the support 10 and caused to project outwardly from the slide supporting surface 12 as shown in FIGURE 2. The ears 23 are spaced so as to define a horizontal line for supporting the bottom edge 24 of the slide shown in FIGURE 3. Ears 23 are positioned with respect to the opening 18 such as to define a marginal supporting surface 25 for the portion of the slide 21 which lies adjacent the edge 24.

The slide supporting surface 12 also includes a die which has an aperture 26 formed through the material and is so positioned as to intersect the stop line 27 which lies between the ears 23 as shown in FIGURE 2. It will be observed that the aperture 26 lies closer to the ear 23, which is adjacent the ears 19, than to the ear 23 which is remote therefrom.

Figure 1:
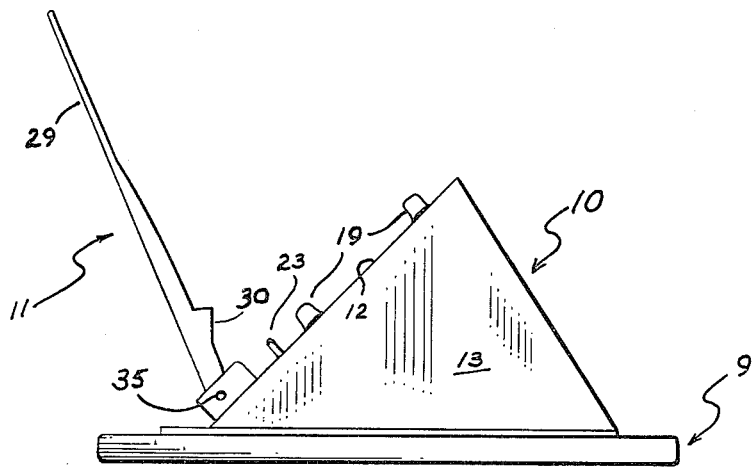
FIGURE 1 is a side elevation of my device showing the punch in retracted position.
Figure 4:
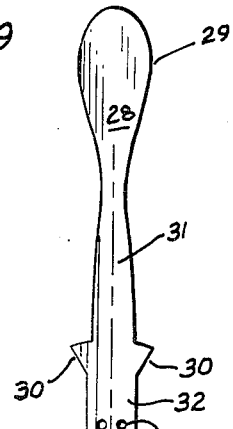
FIGURE 4 is a plan view of the blank from which the handle and punch is formed.

The punch element 11 may be conveniently formed from a sheet blank 28 as shown in FIGURE 4. The blank has a handle portion 29 and a pair of tool members 30 which lie at opposite sides of the center line 31 as shown. Also the lower end 32 which is secured to the handle portion 29 is provided with a pair of spaced openings 33 which lie symmetrically with respect to the center line 31. The blank 28 is folded about the center line so that the two elements 30 and the openings 33 register and form the tool punch as shown in FIGURE 1.

A pair of brackets 34 may be bent upwardly from the supporting surface 12 as shown in FIGURE 2 in spaced parallel relation to accommodate the bent lower end 32 of the punch 11. A pin 35 is inserted through the brackets 34 and through the openings 33 so that the punch 11 can be swung downwardly toward the supporting surface 12 and retracted therefrom. The punch tools 30 are positioned over the die aperture 26 so as to engage the same and provide a suitable notching implement for engaging the edge 24 of slide 21.

The use and operation of the device will be evident from the foregoing. A slide 21 is positioned upon the slide supporting surface 12 such that its edges 23 and 24 respectively engage the ears 19 and 23. The transparency area 36 of slide 21 is of course viewed through the opening 18 so that the slide can be properly oriented. The punch 11 is then depressed against the slide such that the punch tool 30 will enter the aperture 26 and cut a notch 37 into slide 21 through the edge 24 and at a fixed distance 38 from the edge 20. This distance 38 will remain the same irrespective of the variations in size of slide transparencies and will always provide a means for observing visually or of feeling the correct position of the slide when it is to be inserted into a magazine or into a slide carriage of a projector.

It will, of course, be understood that various changes may be made in the form, details, arrangements, and proportions of the parts without departing from the scope of this invention as set forth in the appended claims.

What is claimed is:

1. A device for locating and notching transparency slides having a rectangular periphery which comprises:
   (a) a sheet material support having vertical side panel portions and an inclined front panel portion, said inclined front panel portion providing a slide supporting surface having a viewing opening therein and said support being open at the rear so as to permit light to enter into the interior of said support;
   (b) first fixedly located stop means on said inclined panel portion and spaced somewhat beneath said viewing opening for engaging one edge of a slide;
   (c) second fixedly located stop means on said inclined panel portion and spaced somewhat to one side of said opening so as to engage an adjoining edge of said slide;
   (d) whereby said first and second stop means allow said slide to be positioned in an overlying relation with said opening and the entrance of light via said open rear of said support permits the slide to be viewed so as to ascertain the orientation of its image; and
   (e) an elongated punch element pivotally mounted at one end to said inclined panel portion for pivotal movement about a fixed axis and carrying a tool punch located thereon at a distance from said axis slightly greater than the distance between said axis and said first stop means so as to engage said one edge of the slide for forming a notch therein, said elongated punch element being mounted nearer one of said side panel portions than the other so as to offset the resulting notch relative to the centerline of the slide.

2. A device in accordance with claim 1 in which:
   (a) said slide panel portions each have an outturned flange at its lower edge, and
   (b) a base plate secured to the undersides of said flanges having a reflective upper surface thereon.

3. A device in accordance with claim 1 in which:
   (a) said first and second stop means each includes a pair of aligned upstanding ears formed from the sheet material constituting said inclined front panel portion, and
   (b) a pair of laterally spaced upstanding brackets also formed from the material constituting said inclined front panel portion, said punch element being pivotally mounted between said brackets.

References Cited by the Examiner

UNITED STATES PATENTS

| | | | |
|---|---|---|---|
| 491,253 | 2/93 | Stolle | 83—685 |
| 494,311 | 3/93 | Wills | 83—599 |
| 836,658 | 11/06 | Weidner | 83—467 |
| 873,161 | 12/07 | Munday | 83—597 |
| 926,261 | 6/09 | Krag | 83—467 |
| 1,489,638 | 4/24 | Hemphill | 83—917 |
| 2,363,630 | 11/44 | Wales | 83—597 |
| 2,482,218 | 9/49 | Segal | 83—467 |
| 2,591,519 | 4/52 | Decker | 83—520 |
| 2,613,744 | 10/52 | Hillmer et al. | 83—520 |
| 2,783,842 | 3/57 | Mainardi et al. | 83—520 |
| 2,815,811 | 12/57 | Feiertag | 83—917 |
| 3,161,101 | 12/64 | Falk | 83—599 |

OTHER REFERENCES

Popular Mechanics, "Notch Cut in Cardboard Mounts Aligns Slides for Viewing," July 1954, p. 183.

WILLIAM W. DYER, Jr., *Primary Examiner.*

LEON PEAR, ANDREW R. JUHASZ, *Examiners.*